United States Patent Office 3,404,013
Patented Oct. 1, 1968

3,404,013
ALLOY FOR METALIZING CERAMICS
Bobby Lynn Johnson, Kent, Wash., assignor to The Boeing Company, Seattle, Wash., a corporation of Delaware
No Drawing. Filed Dec. 21, 1964, Ser. No. 420,168
7 Claims. (Cl. 106—1)

ABSTRACT OF THE DISCLOSURE

A metal alloy comprising manganese, molybdenum, and palladium for metalizing surfaces of ceramic materials to facilitate brazing, soldering, or additional metallic plating to the ceramic material. The constituents are prepared in powder form and mixed with a vehicle for brush or spray application to the ceramic surface where the coating is sintered.

---

This invention relates to an alloy for metallizing articles and more particularly to a three component alloy for metallizing ceramic components.

Vacuum tubes having ceramic envelope walls have been used in industry because of their superior properties to glass envelopes. In particular, the superior properties include the mechanical strength and the ability of the ceramic insulating material to withstand higher temperatures more readily than glass structures. One problem encountered early in regard to the manufacture of ceramic insulating materials was obtaining a satisfactory method for joining ceramic sections to adjacent metal sections of the tube, or to other ceramic sections. However, as soon as this problem was solved, there remained one other problem in the field, namely having ceramic discs with a metallized coating which coating needed sensitization in order to subsequently be receptive to coatings of various metallic components needed to complete their construction for use in vacuum tube applications.

One of the more successful metallizing processes heretofore proposed is the process described in the Patents 2,667,427 and 2,667,432, in which a metallized composition containing molybdenum and manganese is fired on the ceramics. However, the processes described by these patents have the innate disadvantage which requires the sensitization of these coatings as above described.

A discussion of Patent 2,667,427 would be helpful at this point in order to present the art for which this invention is an improvement. This patent applies a powder mixture consisting of manganese and molybdenum on the ceramic and sinters the powder onto the ceramic. An additional development to the above patent has been a method of improving the metalizing of a ceramic body by applying a mixture of powders which includes the above two metals, manganese and molybdenum, plus a small amount of titanium, either in the oxide or hydride form. The purpose of the titanium is to produce a metalized surface which has a tighter affinity for the ceramics than the metalized surface that is taught in Patent 2,667,427. However, the metalized coating on the ceramic discs has the innate disadvantage of inability to adequately receive subsequent metallic coatings required for the completion of the assembly of the article. Such inability of the metallic coating to receive further layers of metal is referred to as a lack of sensitization properties.

In light of the above discussion it is therefore an object of this invention to provide an alloy for ceramic bodies so as to enable them to be more receptive to subsequent metallic coating processes.

It is a further object of this invention to retain the innately desirable properties of metalized coatings of the molybdenum-manganese type when deposited on ceramic articles.

Another object of my invention is to provide an improved ceramic insulator including a metallic coating which is free of materials which could result in the effects of electrolysis and ionic conduction in operation of an electric discharge device incorporating such an insulator.

Another object of my invention is to provide an improved ceramic metalizing material adapted for affording dense, smooth, continuous, nonporous and conductive coatings on selected areas of ceramic bodies including bodies of very high alumina content.

Another object of my invention is to provide an improved ceramic metalized member effective for providing a metalized coating which is not glazed and thus is more readily adaptable to brazing materials used with such coatings which are glazed to effect the seal.

Another object of this invention is to provide a new and improved metalizing material adapted for providing a metalized coating particularly suitable for use with hard solders.

Another object of the invention is to provide a metalized coating on ceramic bodies, which coating is sensitive to the subsequent application of additional metallic coatings.

Further objects and advantages of my invention will become apparent as the following description proceeds and the features of novelty which characterize my invention will be pointed out with particularity in the claims annexed to this specification.

This invention in its broad aspect is a metalizing composition which is an improvement over previous nonsensitized molybdenum-manganese and molybdenum mixtures. The method of sensitizing the molybdenum-manganese and molybdenum ceramic metalizing mixtures comprises the step of adding to such a mixture of sensitizing component selected from the group consisting of palladium and palladium alloys.

The following is a recital of the new compositions of matter taught by the instant invention.

COMPOSITION I

| | Percentage by wt. |
|---|---|
| Molybdenum | 89–91 |
| Palladium | 9–11 |

COMPOSITION II

| | Percentage by wt. |
|---|---|
| Molybdenum | 80–88 |
| Manganese | 3–9 |
| Palladium | 9–11 |

COMPOSITION III

| | Percentage by wt. |
|---|---|
| Molybdenum | 70–79 |
| Manganese | 12–19 |
| Palladium | 9–11 |

COMPOSITION IV

| | Percentage by wt. |
|---|---|
| Molybdenum | 60–69 |
| Manganese | 22–29 |
| Palladium | 9–11 |

A typical procedure for synthesizing the alloy compositions selected from the above compositions would be as follows. The powder of the various components in their proper proportions are mixed in a container which is subsequently ball milled for 100 hours as a powder with the addition of solvents to bring the viscosity of the total mixture to approximately 22 seconds on a Zahn viscosimeter.

Spraying compositions can be prepared by adding more solvents until a desired viscosity for spraying is obtained. In practice it has been found that the following solvents can be added to approximately 200 grams lots of the compositions of the instant invention:

| Solvents: | Ml. |
|---|---|
| Methyl-ethyl-ketone | 55 |
| Ethyl ether | 50 |
| Binder, nitrocellulose lacquer | 45 |

Additional solvent of methyl-ethyl-ketone and ethyl ether in the same relative proportions is added as needed for spraying viscosities.

In order that those skilled in the art may better understand how the present invention may be carried into effect, the following, illustrative examples thereof are given. These examples are merely illustrative and in no way serve to limit or qualify the practice of the instant invention.

Example 1

| | Parts |
|---|---|
| Molybdenum powder | 182 |
| Palladium powder | 18 |

The above aggregate of Example 1 is added to a gallon ball mill containing:

| | Ml. |
|---|---|
| Methyl-ethyl-ketone | 55 |
| Ethyl ether | 50 |
| Nitrocellulose lacquer | 45 |

Additional methyl-ethyl-ketone and ethyl ether can be added in the same one to one proportion until the desired viscosity is obtained for spraying.

The above mixture was ground for 100 hours in the ball mill with the subsequent addition of solvents (methyl-ethyl-ketone and ethyl ether) as needed to achieve the proper viscosity, such additions being dependent upon whether spraying or other forms of application would be use. Simple spraying or coating of the said composition is easily practiced by those familiar with the art, and will not be described herein. Also the proper procedures of sintering the assemblies after application of the above composition is also readily practiced by those familiar with the art and will not be described in this specification.

Example 2

| | Parts |
|---|---|
| Molybdenum powder | 166 |
| Manganese powder | 14 |
| Palladium powder | 20 |

The above mixture was treated similar to the procedure used in Example 1.

Example 3

| | Parts |
|---|---|
| Molybdenum powder | 150 |
| Manganese powder | 28 |
| Palladium powder | 22 |

The above mixture was treated similar to the procedure used in Example 1.

Example 4

| | Parts |
|---|---|
| Molybdenum powder | 120 |
| Manganese powder | 66 |
| Palladium powder | 18 |

The above mixture was treated similar to the procedure used in Example 1.

The metallic powders used to synthesize the compositions of the instant invention are of normal commercial grade as readily purchased on the market. A wide range of particle size of the metallic powders can be employed in fabricating the instant compositions.

The instant invention eliminates the practice previously necessary with the molybdenum-manganese coated ceramic member of sensitizing the metallized portion of said member. The sensitizing step was necessary in order to get the metallized molybdenum-manganese mixture receptive to additional coating of metallic constituents needed to complete the assembly of the metalized ceramic member. This step was costly in the aspect of time and labor normally associated with such a hand-type process in modern industry. The molybdenum-manganese composition was sensitized with a concentrated solution of hypophosphite and each metallized area must be touched with a steel or aluminum probe in order to start the catalytic action before nickel or gold electroplating can be performed on the metallized ceramic members. It is readily apparent to those skilled in this art that the above compositions, in accordance with the teachings of this invention, which eliminates the sensitization process, is a great advance in the art and of immediate importance in saving labor. In addition the composition of the instant invention has improved surface properties over the prior art. Inconsistent results and loss of time have been eliminated by the instant invention, and the instant invention makes the metallized area self catalytic, thus avoiding the previously necessary steel or aluminum probing operations. Additional advantages from the palladium component have been the elimination of overplating of nickel and gold due to a more ready wetting of the metallized portion of said metalized ceramic member with solder materials.

In accordance with the teachings of the instant invention, I metalize a ceramic body for an electrical component to provide a surface suitable for bonding to a metal or metallized body to form between the two bodies a vacuum type joint of high mechanical strength by coating the ceramic with a mixture of metal powders consisting of molybdenum, manganese and palladium in the various proportions set forth by the instant invention, and then firing the coated ceramic in a reducing atmosphere at a temperature at least as high as the sintering temperature of the mixture.

While I have described and illustrated some preferred forms of my invention, it should be understood that many modifications may be made without departing from the spirit and scope of the invention, and it should therefore be understood that this invention is limited only by the scope of the appended claims.

I claim:

1. A composition of matter for metalizing ceramic bodies consisting essentially of elemental manganese, elemental molybdenum and elemental palladium.

2. A composition of matter for metalizing ceramic bodies consisting essentially of 80 to 88 parts of molybdenum, 3 to 9 parts of manganese and 9 to 11 parts of palladium.

3. A composition of matter for metalizing ceramic bodies consisting essentially of 70 to 79 parts of molybdenum, 12 to 19 parts of manganese and 9 to 11 parts of palladium.

4. A composition of matter for metalizing ceramic bodies consisting essentially of 60 to 69 parts of molybdenum, 20 to 29 parts of manganese and 9 to 11 parts of palladium.

5. A composition of matter for metalizing ceramic bodies consisting essentially of 83 parts of molybdenum, 7 parts of manganese and 10 parts of palladium.

6. A composition of matter for metalizing ceramic bodies consisting essentially of 75 parts molybdenum, 14 parts of manganese and 11 parts of palladium.

7. A composition of matter for metalizing ceramic bodies consisting essentially of 60 parts of molybdenum, 31 parts of manganese and 9 parts of palladium.

References Cited

UNITED STATES PATENTS

| | | | |
|---|---|---|---|
| 2,722,496 | 11/1955 | Hosmer | 117—123 X |
| 2,835,967 | 5/1958 | Umblia | 117—22 X |
| 2,996,401 | 8/1961 | Welch et al. | 117—22 |
| 3,039,892 | 6/1962 | Nolte | 117—22 X |
| 3,190,749 | 6/1965 | Fleming | 75—176 X |
| 3,289,291 | 12/1966 | Reed | 106—1 |
| 3,318,683 | 5/1967 | Foster et al. | 75—176 X |

WILLIAM L. JARVIS, *Primary Examiner.*